United States Patent
Heins (10) Patent No.: US 11,079,491 B1
(45) Date of Patent: Aug. 3, 2021

(54) DETECTING OBJECTS IN OBSCURED ENVIRONMENTS VIA SPECKLE CORRELATION

(71) Applicant: Alan Heins, East Hartford, CT (US)

(72) Inventor: Alan Heins, East Hartford, CT (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 492 days.

(21) Appl. No.: 16/102,355

(22) Filed: Aug. 13, 2018

(51) Int. Cl.
  *G01C 3/08* (2006.01)
  *G01S 17/04* (2020.01)
  *G01S 7/481* (2006.01)
  *G01S 17/89* (2020.01)

(52) U.S. Cl.
  CPC ............ *G01S 17/04* (2020.01); *G01S 7/4816* (2013.01); *G01S 17/89* (2013.01)

(58) Field of Classification Search
  CPC ......... G01S 17/04; G01S 17/89; G01S 7/4816
  USPC ...................................................... 356/4.01
  See application file for complete search history.

(56) References Cited

U.S. PATENT DOCUMENTS

| | | | | |
|---|---|---|---|---|
| 10,495,439 | B2 * | 12/2019 | Tumlinson | ......... G01B 9/02091 |
| 2014/0028974 | A1 * | 1/2014 | Tumlinson | ......... G01B 9/02043 |
| | | | | 351/206 |

FOREIGN PATENT DOCUMENTS

JP  2005249397  *  3/2004  ................ G01P 3/36

OTHER PUBLICATIONS

Ruffing: "Application of speckle-correlation methods to surface-roughness measurement: a theoretical study"; J. Opt. Soc. Am. A., vol. 3, No. 8, Aug. 1986, pp. 1297-1304.
Muskens et al.: "Angle dependence of the frequency correlation in random photonic media: Diffusive regime and its breakdown near localization"; Physical Review B84, DOI: 10.1103/PhysRevB.84.035106, 2011, pp. 035106-1-035106-7.
Lohmann et al.: "Speckle masking in astronomy: triple correlation theory and applications"; Applied Optics, vol. 22, No. 24; Dec. 15, 1983; pp. 4028-4037.
Knothe et al.: "Frequency correlations in reflection from random media"; J. Opt. Soc. Am. A, vol. 32, No. 2; Feb. 2015; pp. 305-313.

* cited by examiner

*Primary Examiner* — Mark Hellner
(74) *Attorney, Agent, or Firm* — Tarolli, Sundheim, Covell & Tummino LLP (57) ABSTRACT

Systems and methods are provided for provided for determining the presence of an object within a region of interest. A broadband laser is projected at a selected location in the region of interest. Reflected light from the selected location in the region of interest is received at a receiver. The received light is dispersed by wavelength across a first axis at a dispersive element. The received light is dispersed by return angle across a second axis at a defocuser. The received light is imaged to provide an image, and a metric representing a correlation between the wavelength and the return angle is measured in the image to determine the presence of the object.

20 Claims, 5 Drawing Sheets

DETECTING OBJECTS IN OBSCURED ENVIRONMENTS VIA SPECKLE CORRELATION

TECHNICAL FIELD

This invention relates to imaging systems, and more particularly, to detecting objects in obscured environments via speckle correlation.

BACKGROUND

Finding targets and obstacles through smoke, fog, and heavy rain is a major concern for aircraft and ground-based tactical vehicles. Additionally, distinguishing manmade objects from natural ones in cluttered environments is a difficult task even in clear conditions, and the difficulty increases as visibility declines. In some operating environments, many objects are intentionally camouflaged, and ordinary imaging systems have little ability to discriminate between real natural backgrounds and objects simply painted to resemble them.

Most low-visibility atmospheres are scattering rather than absorbing. A common example of this is a cloudy day, when the sun cannot be imaged at all, but the sky is still light. The clouds are scattering the sunlight, but absorbing very little of it. For very small particles, the scattering cross section decreases with the optical wavelength (Rayleigh scattering), allowing better performance at longer wavelengths. However, for wavelengths longer than the visible and near infrared range, current imaging technology is much more expensive, lower resolution, and often has higher size, weight, and power requirements than silicon-based cameras.

At the long-wavelength extreme, radar can penetrate many obscurants that infrared light cannot, but radar systems are typically physically massive and power-hungry compared to optical systems, and the resolution is poor. For Mie scattering, that is, scattering from particles of a size comparable to the optical wavelength, longer wavelengths are not guaranteed to give an advantage. LIDAR systems can sometimes be used to see through a scattering atmosphere using range gating, in which photons not arriving within a certain time window following the transmit pulse are ignored. Range gating can give impressive results, but is typically a slow process, especially if the target range is not known a priori. Performance degrades as the scatterer density becomes higher and the process moves from single scattering to multiple scattering, as multiple scattering allows targets located closer than the gated range to contribute light. Further, range-gated LIDAR does not provide any intrinsic manmade-object discrimination capabilities.

SUMMARY OF THE INVENTION

In accordance with an aspect of the present invention, a method is provided for determining the presence of an object within a region of interest. A broadband laser is projected at a selected location in the region of interest. Reflected light from the selected location in the region of interest is received at a receiver. The received light is dispersed by wavelength across a first axis at a dispersive element. The received light is dispersed by return angle across a second axis at a defocuser. The received light is imaged to provide an image, and a metric representing a correlation between the wavelength and the return angle is measured in the image to determine the presence of the object.

In accordance with another aspect of the present invention, a system is provided for determining the presence of an object within a region of interest. A broadband laser projects light at a selected location in the region of interest. A receiver receives reflected light from the selected location in the region of interest. The receiver includes a dispersive element that disperses the received light by wavelength across a first axis, a defocuser that disperses the received light by return angle across a second axis, an imager that images the received light to provide an image, and an image analysis component that measures a metric representing a correlation between the wavelength and the return angle in the image to determine the presence of the object.

In accordance with yet another aspect of the present invention, a system is provided for determining the presence of an object within a region of interest. A broadband laser projects light at a selected location in the region of interest. A receiver receives reflected light from the selected location in the region of interest. The receiver includes one of a diffractive grating and a dispersive prism that disperses the received light by wavelength across a first axis, a cylindrical lens that disperses the received light by return angle across a second axis, an imager that images the received light to provide an image, and an image analysis component that measures a correlation length between the wavelength and the return angle in the image to determine the presence of the object. The image analysis component determines that the object is present if the correlation length exceeds a threshold value. A user interface alerts an operator of the presence of the object if the image analysis component determines that the object is present.

DETAILED DESCRIPTION OF THE INVENTION

The systems and methods proposed herein allow for detection and categorization of objects in obscured conditions by detecting correlations in speckle patterns from reflected light. When light from a multi-wavelength laser is projected toward a target and the scattered signal is collected, the speckle in it will come from two components: the scattering in the atmosphere, both during transit to the object and one the return path, and the scattering from the target itself. The systems and methods herein utilize a receiver that simultaneously resolves wavelength and return angle, allowing for correlations between return angle and wavelength to be analyzed. The presence and origin (e.g., natural or man-made) of objects can be determined from the correlation between return angle and wavelength in the returned speckle pattern.

Figure 1:
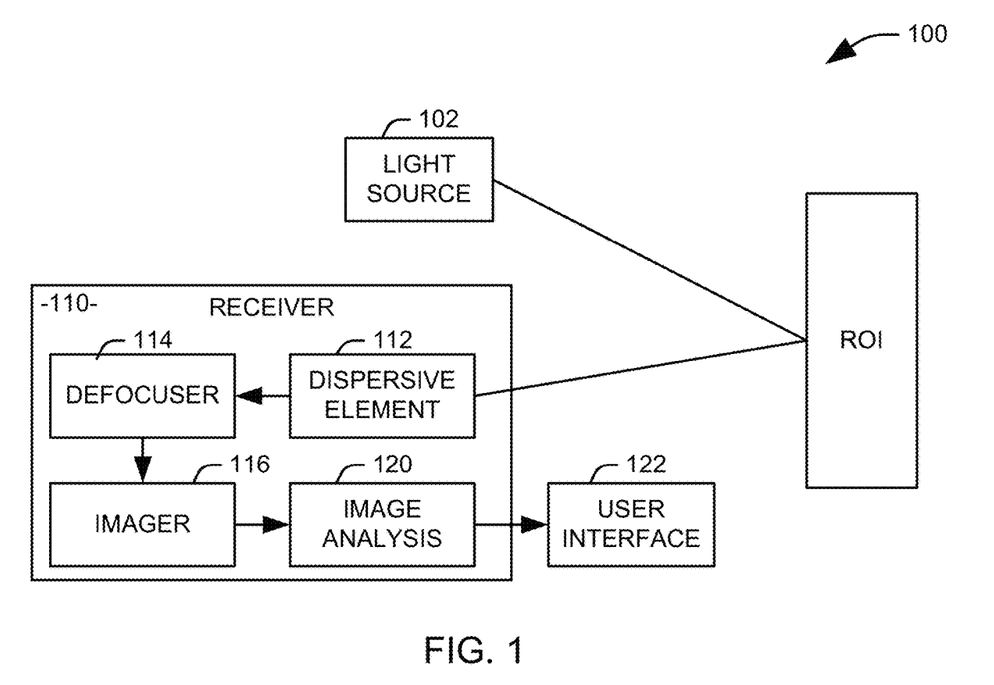
FIG. 1 illustrates a system for detecting objects in a region of interest.

FIG. 1 illustrates a system 100 for detecting objects in a region of interest. The system 100 includes a light source 102 that directs a multi-wavelength laser at the region of interest. The light source 102 can further include either mechanical or optical means to scan the laser across the region of interest. It will be appreciated that the word "light," as used herein, is intended to include electromagnetic radiation in the visible, infrared, and ultraviolet bands. In the illustrated implementation, the broadband laser produces light in the short-wavelength infrared band. Light reflected from the region of interest is received at a receiver 110. The receiver 110 includes a dispersive element 112 that disperses the received light by wavelength across a first axis, and a defocuser 114 that disperses the received light by a return angle of the light across a second axis that is perpendicular to the first axis. In one implementation, the dispersive element 112 can be implemented as a dispersive prism or a diffraction grating, and the defocuser 114 can be implemented as a cylindrical lens.

The dispersed light is then imaged at an imager 116 to provide an image of the reflected light. Due to the action of the dispersive element 112 and the defocuser 114, the image will include an intensity value for each of a plurality of ordered pairs of angle of return and wavelength. An image analysis component 120 can review the image for correlations in the intensity value across wavelength and angle of return. From the determined correlations, it can be determined if a natural or man-made object is in the region of interest. A user interface 122 alerts an operator of the presence of the object if the image analysis component 120 determines that the object is present.

In highly scattering environments, imaging of objects becomes infeasible, as imaging uses a lens to sort rays based on their angles of incidence, which is the very optical parameter which scatterers perturb. While ray angles are fragile parameters that are easily disturbed in real environments, the correlations between different rays are not. Many different types of correlations between adjacent optical bundles can be defined. One of the more difficult correlations to destroy is coherence, the property of laser light that produces speckle. While individual speckle patterns can easily be changed, eliminating speckle altogether is very difficult, and the subject of much commercial research. In fact, current commercial speckle reducers do not actually remove speckle, but rather modulate it at a high enough rate to fool the eye. Speckle measurements can be used to distinguish laser light from natural light, even in highly scattering environments, because the spatial and temporal correlation that produces it is very robust.

Single color speckle primarily carries laser source information. When light hits a solid target, the speckle carries target information, and some data on the surface roughness could potentially be extracted from the speckle size. For example, a very clean optically-polished target would produce no speckle at all. Unfortunately, the scattering atmosphere produces its own speckle pattern, superimposed on that of the target, and may well mask any useful target information.

The current system 100 uses multiple wavelengths and angular resolution simultaneously. A microscopically rough, flat surface behaves like a superposition of random gratings. Whenever a particular color of light at a particular angle happens to satisfy the grating equation, a bright speckle is formed. At a slightly different angle, a slightly different wavelength will be brought into phase, again following the grating equation. The grating equation holds for any angle and wavelength for a true grating, that is, an object with only one periodicity of scatterers. For a random grating, the range of angles and wavelengths over which it holds will be more limited but will not be zero for a continuous surface.

The situation is quite different for a volume scatterer. A given arrangement of particles suspended in the air will create a bright return at a single wavelength. However, because this random "volume grating" now has depth as well as transverse extent, its behavior at other wavelengths will be much more complex and is not expected to follow any simple equation. For many particle arrangements that happen to produce a bright return at a first wavelength, there is no angle for which all of the secondary waves can be in phase for a second wavelength. If the volume grating is imagined as a stack of planar gratings, then the situation can be explained by realizing that a bright return for the first wavelength corresponds to an m=1 order for one grating and a bright return for the second wavelength corresponds to an m=2 order for the other. A superposition of many orders in many grating equations will result in an extremely short angle-to-wavelength correlation range. The system 100 can exploit this difference to separate speckle coming from dust from that generated by solid objects.

To this end, the image analysis component 120 can search the received image for correlations between the return angle and the wavelength of the received light to determine if there is an object in the region of interest. In one implementation, this can be done simply by calculating a coefficient of multiple correlation of return angle and wavelength on the intensity of the returned light. In one example, this can be calculated as the Pearson correlation coefficient between the predicted and the actual values of the dependent variable in a linear regression model that includes an intercept. The presence of an object could then be determined by comparing the coefficient value to a threshold, with values of the correlation coefficient above the threshold indicating the presence of an object in the region of interest.

Alternatively, the image analysis component 120 can determine a correlation length for the return angle and the wavelength. In one example, a set of spatial autocorrelation measures, such as the Moran I or Geary's C, can be calculated for the image. At each point, the set of spatial autocorrelation measures can be determined for a plurality of different lag values, representing the distance over which the autocorrelation is performed. The spatial autocorrelation measure can then be reviewed across values of the lag to determine at what point in the lag that the spatial autocorrelation falls below a threshold percentage of a maximum value. This value can be used as the correlation length. Shorter correlation lengths can indicate the absence of an object, with longer correlation lengths representing manmade objects, and intermediate correlation lengths representing natural objects.

In another implementation, an edge detection algorithm, such as Canny edge detection, can be applied to the image to find edges within the image. The lengths of edges within the object can be determined, with a selected edge length, for example, an edge length representing the seventy-fifth percentile of the measured edges, selected as a metric. As with the correlation length, smaller values for this metric can indicate the absence of an object, larger values of this metric can represent manmade objects, and intermediate values can represent natural objects, with the thresholds between "small", "intermediate", and "large" values varying with the implementation.

While the angle-wavelength correlation technique employed at the image analysis component is not an imaging technique, it may still be able to determine the rough outline of a target as the light source 102 is swept across a region. The surface relief of most objects is much more pronounced when viewed at near-glancing incidence, and this should significantly change the grating properties of the material over the case when it is viewed near normal. This change in correlation properties could be used to trace the outline of an object as the beam and receive directions are scanned. In particular, the left and right sides of an object, with "left" and "right" here referring to the angularly-resolved direction, are anticipated to have correlations with opposite slopes. Accordingly, the system 100 could determine the presence, nature (e.g, man-made or natural), and general shape of the object.

Figure 2:
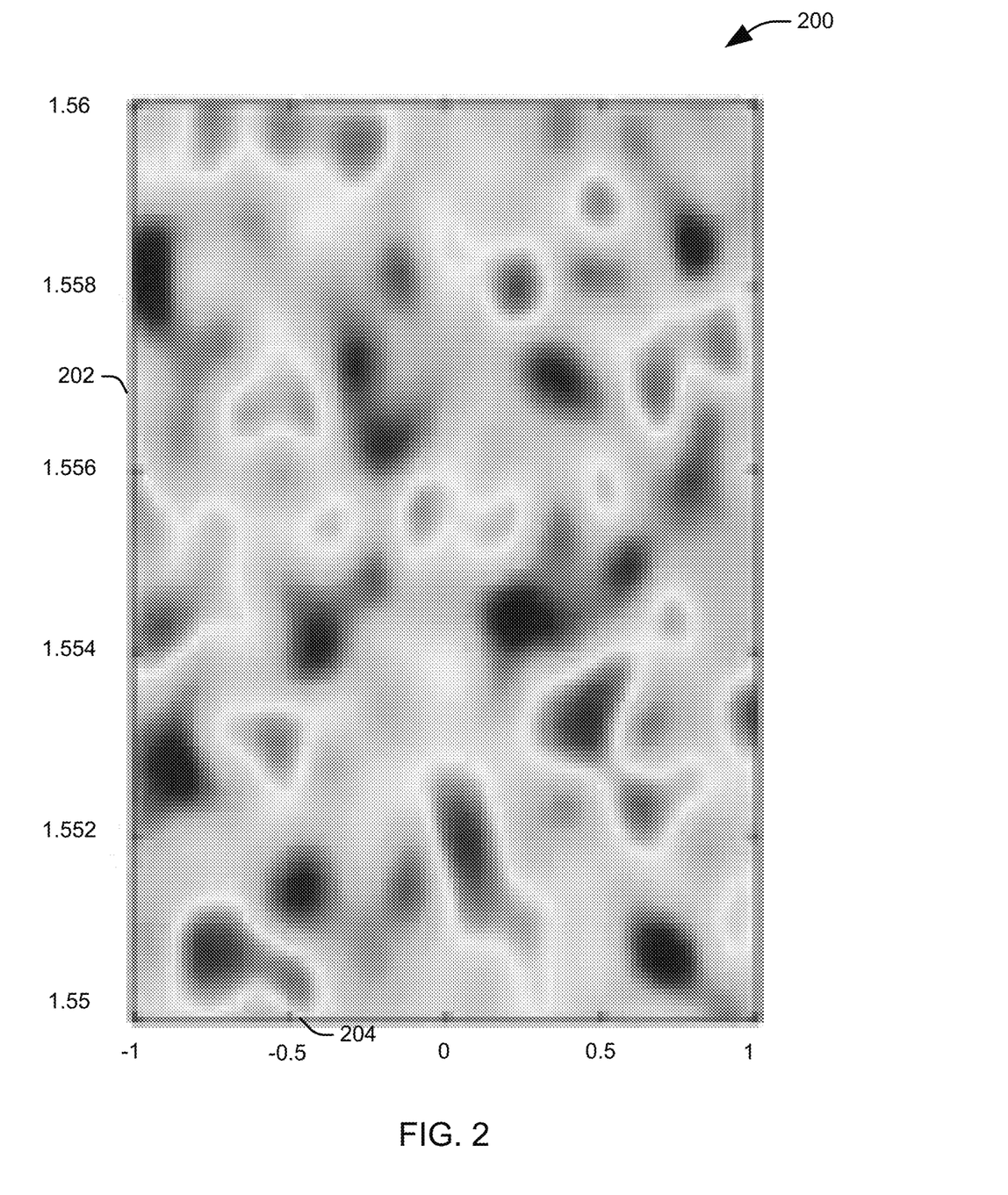
FIG. 2 illustrates one example of an image that might be produced by the system of FIG. 1 in an obscured environment in which no object is present.

FIG. 2 illustrates one example of an image 200 that might be produced by the system 100 of FIG. 1 in an obscured environment in which no object is present. In the illustrated image 200, the dispersive element 112 spreads the received light by wavelength along a vertical axis 202 of the image, and the defocuser 114 spreads the received light along a horizontal axis 204. Values for the wavelength on the vertical axis are given in micrometers and values for the angle of return, relative to a central axis of the imager 100 are given in degrees on the horizontal axis. In the illustrated image 200, only weak correlation between the return angle and the wavelength is present, and the image has only specular blobs.

Figure 3:
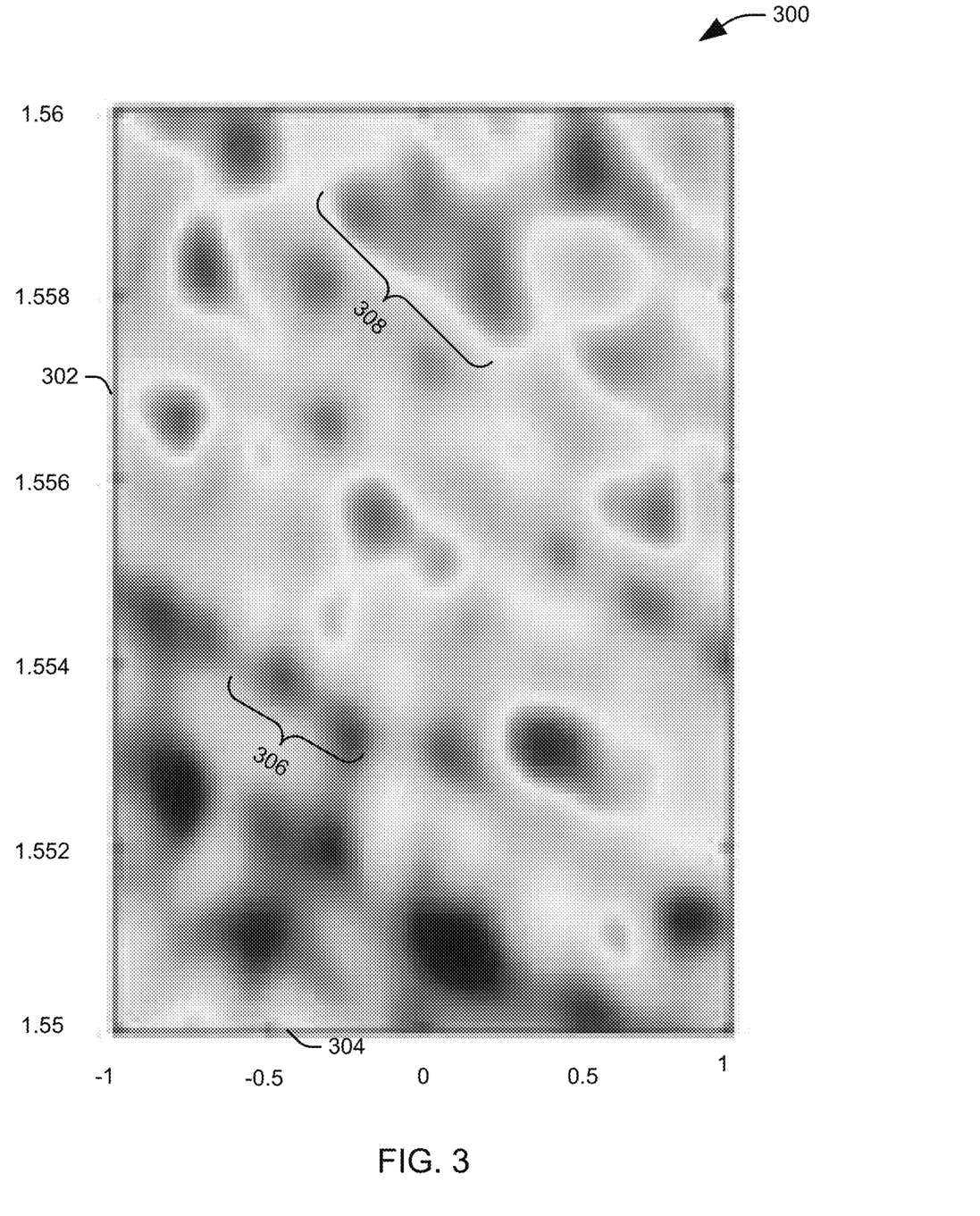
FIG. 3 illustrates one example of an image that might be produced by the system of FIG. 1 when a natural object is present in an obscured environment.

FIG. 3 illustrates one example of an image 300 that might be produced by the system 100 of FIG. 1 when a natural object is present in an obscured environment. In the illustrated image 300, the dispersive element 112 spreads the received light by wavelength along a vertical axis 302 of the image, and the defocuser 114 spreads the received light along a horizontal axis 304. Values for the wavelength on the vertical axis are given in micrometers and values for the angle of return, relative to a central axis of the imager 100 are given in degrees on the horizontal axis. In the illustrated image, moderate correlation between the return angle and the wavelength is present, and rough lines (e.g., 306 and 308) of similar intensity values can be seen in the image. It will be appreciated that stronger correlations will create solid lines of increasing length, with the shape of the lines dictated by the grating properties of the surface.

A volume scatterer and a flat surface represent two extremes. Natural surfaces, such as sand, stone, and grass, have both macro and micro surface roughness. They can therefore be thought of as intermediate between a surface scatterer and a volume scatterer like the atmosphere. Accordingly, the correlation length for natural objects will be shorter than that of most manmade objects, which are usually made of macroscopically smooth facets with only a microscopically rough coating such as paint or corrosion. The distinction between "flat" and "rough" here depends on the incident beam size—if the surface is planar over one beam spot, it will behave as a "flat" rather than a "rough" scatterer. This provides an additional degree of freedom for measuring distant surfaces, although the beam size will always be broadened by scattering.

Figure 4:
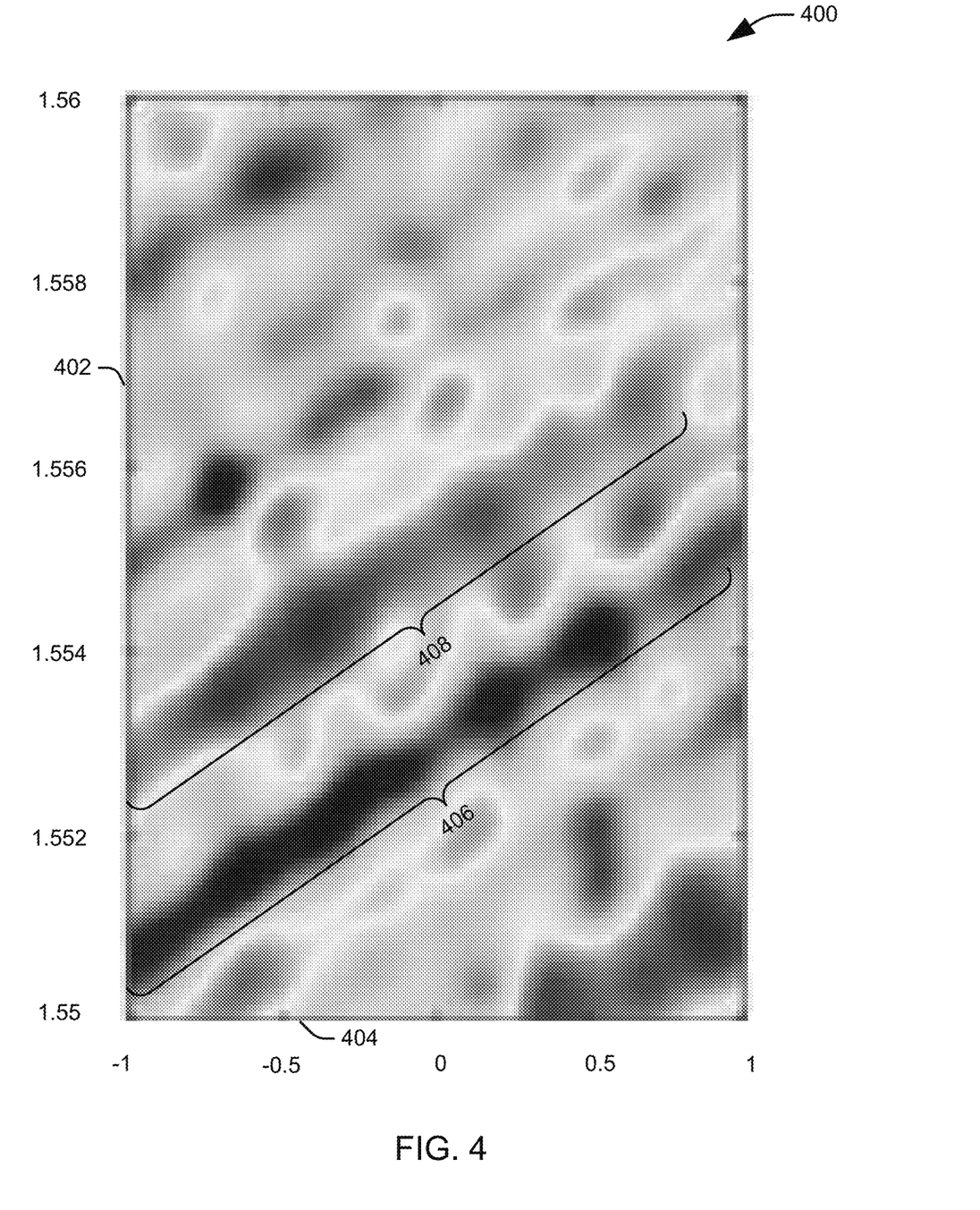
FIG. 4 illustrates one example of an image that might be produced by the system of FIG. 1 when a man-made object is present in an obscured environment.

FIG. 4 illustrates one example of an image 400 that might be produced by the system 100 of FIG. 1 when a man-made object is present in an obscured environment. In the illustrated image 400, the dispersive element 112 spreads the received light by wavelength along a vertical axis 402 of the image, and the defocuser 114 spreads the received light along a horizontal axis 404. Values for the wavelength on the vertical axis are given in micrometers and values for the angle of return, relative to a central axis of the imager 100 are given in degrees on the horizontal axis. In the illustrated image, strong correlation between the return angle and the wavelength is present, and long, clear lines (e.g., 406 and 408) of similar intensity values can be seen in the image. The angle of the lines representing the correlation depends on the angle of the dominant grating vector of the surface to the observer and is expected to flip on the left and right sides of a solid object.

Beyond their general faceted nature relative to natural objects, certain human-produced coatings may have very striking correlation properties. Paints, for example, typically consist of a base, such as latex or oil, an opacifier, and a pigment. The opacifier is usually microbeads of titanium dioxide, a high-index material that is strongly scattering. Much of the surface-hiding ability of paint is due to these beads rather than the pigment itself. This sheet of uniform beads can produce a very distinct signature in an angle-wavelength correlation measurement, allowing for ready identification of painted surfaces.

Figure 5:
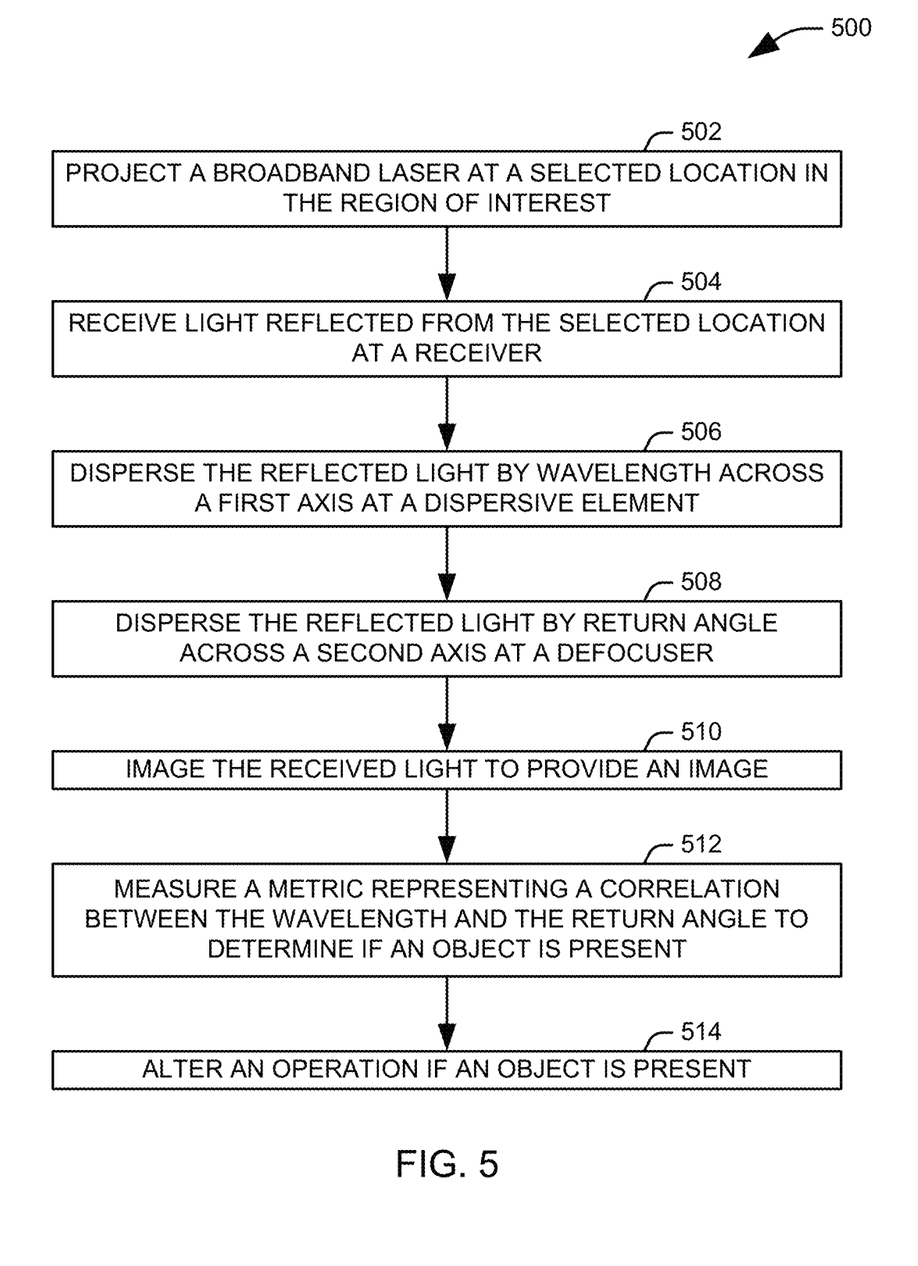
FIG. 5 illustrates a method for determining the presence of an object within a region of interest.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 5 illustrates a method 500 for determining the presence of an object within a region of interest. At 502, a broadband laser is projected at a selected location in the region of interest. It will be appreciated that the laser can be projected at or swept through multiple points, with the presence of an object determined for each point via steps 504, 506, 508, 510, and 512 of the method 500. At 504, reflected light is received from the selected location in the region of interest at a receiver. At 506, the received light is dispersed by wavelength across a first axis at a dispersive element, such as a diffractive prism or grating. At 508, the received light is dispersed by return angle across a second axis at a defocuser, such as a cylindrical lens. The received light is imaged at 510 to provide an image.

At 512, a metric representing a correlation between the wavelength and the return angle in the image is measured to determine the presence of the object. In one implementation, a coefficient of multiple correlation of the return angle and the wavelength on the intensity of the reflected light in the image is determined. An object is determined to be present if the coefficient of multiple correlation exceeds a threshold value. In another implementation, a correlation length between the return angle and the wavelength in the image is determined, for example, by determining the Moran I or Geary's C. In this implementation, an object is determined to be present if the correlation length exceeds a first threshold value, and the object is determined to be a man-made object if the correlation length exceeds a second threshold value. At 514, an operator is alerted if it is determined that the object is present in the region of interest. The alert can take the form, for example, of a visible alarm, displayed text, an audible alarm or message, or tactile feedback to the operator.

Figure 6:
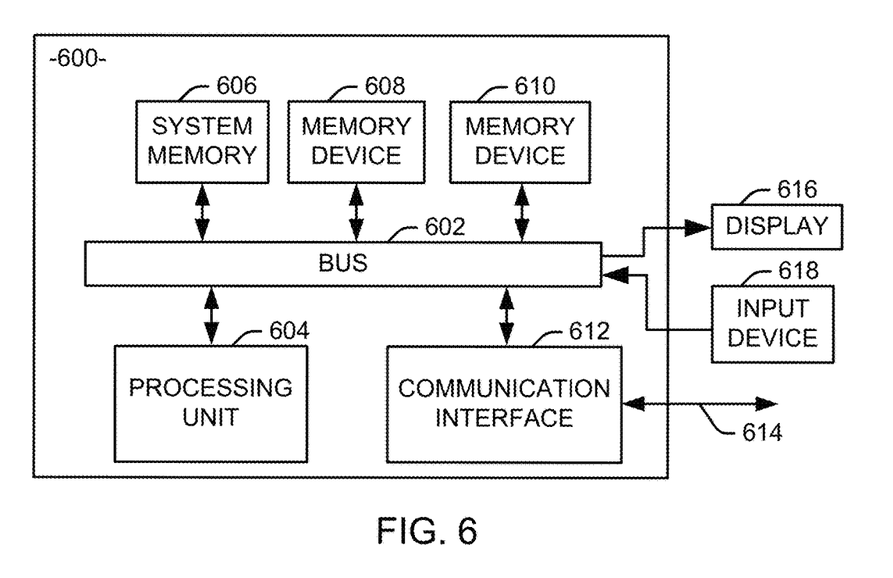
FIG. 6 is a schematic block diagram illustrating an exemplary system of hardware components capable of implementing examples of the systems and methods disclosed.

FIG. 6 is a schematic block diagram illustrating an exemplary system 600 of hardware components capable of implementing examples of the systems and methods disclosed in FIGS. 1-5, such as the image analysis component 120 illustrated in FIG. 1. The system 600 can include various systems and subsystems. The system 600 can be a personal computer, a laptop computer, a workstation, a computer system, an appliance, an application-specific integrated circuit (ASIC), a server, a server blade center, a server farm, etc.

The system 600 can includes a system bus 602, a processing unit 604, a system memory 606, memory devices 608 and 610, a communication interface 612 (e.g., a network interface), a communication link 614, a display 616 (e.g., a video screen), and an input device 618 (e.g., a keyboard and/or a mouse). The system bus 602 can be in communication with the processing unit 604 and the system memory 606. The additional memory devices 608 and 610, such as a hard disk drive, server, stand-alone database, or other non-volatile memory, can also be in communication with the system bus 602. The system bus 602 interconnects the processing unit 604, the memory devices 606, 608, and 610, the communication interface 612, the display 616, and the input device 618. In some examples, the system bus 602 also interconnects an additional port (not shown), such as a universal serial bus (USB) port.

The processing unit 604 can be a computing device and can include an application-specific integrated circuit (ASIC). The processing unit 604 executes a set of instructions to implement the operations of examples disclosed herein. The processing unit can include a processing core.

The additional memory devices 606, 608 and 610 can store data, programs, instructions, database queries in text or compiled form, and any other information that can be needed to operate a computer. The memories 606, 608 and 610 can be implemented as computer-readable media (integrated or removable) such as a memory card, a disk drive, a compact disk (CD), or a server accessible over a network. In certain examples, the memories 606, 608 and 610 can comprise text, images, video, and/or audio, portions of which can be available in formats comprehensible to human beings. Additionally or alternatively, the system 600 can access an external data source or query source through the communication interface 612, which can communicate with the system bus 602 and the communication link 614.

In operation, the system 600 can be used to implement one or more parts of an object detection and categorization system in accordance with the present invention. Computer executable logic for implementing the composite applications testing system resides on one or more of the system memory 606, and the memory devices 608, 610 in accordance with certain examples. The processing unit 604 executes one or more computer executable instructions originating from the system memory 606 and the memory devices 608 and 610. The term "computer readable medium" as used herein refers to any medium that participates in providing instructions to the processing unit 604 for execution, and it will be appreciated that a computer readable medium can include multiple computer readable media each operatively connected to the processing unit.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for determining the presence of an object within a region of interest, comprising:
    projecting a broadband laser at a selected location in the region of interest;
    receiving reflected light from the selected location in the region of interest at a receiver;
    dispersing the received light by wavelength across a first axis at a dispersive element;
    dispersing the received light by return angle across a second axis at a defocuser;
    imaging the received light to provide an image;
    measuring a metric representing a correlation between the wavelength and the return angle in the image to determine the presence of the object; and
    alerting an operator if it is determined that the object is present in the region of interest.

2. The method of claim 1, wherein the metric is a first metric, the image is a first image, and the method further comprises:
    selecting a new location in the region of interest;
    projecting the broadband laser at the new location;
    receiving reflected light from the new location in the region of interest at the receiver;
    dispersing the received light from the new location by wavelength across the first axis at the dispersive element;
    dispersing the received light from the new location by return angle across the second axis at the defocuser;
    imaging the received light from the new location to provide a second image; and
    measuring a second metric representing a correlation between the wavelength and the return angle in the second image to determine the presence of the object.

3. The method of claim 1, wherein measuring the metric representing a correlation between the wavelength and the return angle in the image to determine the presence of the object comprises determining a coefficient of multiple correlation of the return angle and the wavelength on an intensity of the reflected light in the image.

4. The method of claim 1, wherein measuring the metric representing a correlation between the wavelength and the return angle in the image to determine the presence of the object comprises determining a correlation length between the return angle and the wavelength in the image.

5. The method of claim 4, wherein measuring the metric representing a correlation between the wavelength and the return angle in the image to determine the presence of the object further comprises determining that the object is present if the correlation length exceeds a first threshold value and determining that the object is a man-made object if the correlation length exceeds a second threshold value.

6. A system for determining the presence of an object within a region of interest, comprising:
    a broadband laser that projects light at a selected location in the region of interest;
    a receiver that receives reflected light from the selected location in the region of interest, the receiver comprising:
        a dispersive element that disperses the received light by wavelength across a first axis;

a defocuser that disperses the received light by return angle across a second axis;

an imager that images the received light to provide an image; and an image analysis component that measures a metric representing a correlation between the wavelength and the return angle in the image to determine the presence of the object, the image analysis component determining that an object is present if the metric exceeds a threshold value.

7. The system of claim 6, wherein the broadband laser projects the light in a wavelength band within the infrared band.

8. The system of claim 6, wherein the dispersive element is implemented as a dispersive prism.

9. The system of claim 6, wherein the dispersive element is implemented as a diffraction grating.

10. The system of claim 6, wherein the defocuser is implemented as a cylindrical lens.

11. The system of claim 6, further comprising a user interface that alerts an operator of the presence of the object if the image analysis component determines that the object is present.

12. The system of claim 6, wherein the image analysis component determines a coefficient of multiple correlation of the return angle and the wavelength in the image.

13. The system of claim 6, wherein the threshold value is a first threshold value and the image analysis component determines that the object is a man-made object if the metric exceeds a second threshold value.

14. The system of claim 6, wherein the image analysis component determines a correlation length between the return angle and the wavelength in the image.

15. A method for determining the presence of an object within a region of interest, comprising:

projecting a broadband laser at a selected location in the region of interest;

receiving reflected light from the selected location in the region of interest at a receiver;

dispersing the received light by wavelength across a first axis at a dispersive element;

dispersing the received light by return angle across a second axis at a defocuser;

imaging the received light to provide an image; and measuring a metric representing a correlation between the wavelength and the return angle in the image to determine the presence of the object;

wherein measuring the metric representing a correlation between the wavelength and the return angle in the image to determine the presence of the object comprises determining a coefficient of multiple correlation of the return angle and the wavelength on an intensity of the reflected light in the image.

16. The method of claim 15, wherein measuring the metric representing a correlation between the wavelength and the return angle in the image to determine the presence of the object further comprises determining that the object is present if the coefficient of multiple correlation exceeds a threshold value.

17. A method for determining the presence of an object within a region of interest, comprising:

projecting a broadband laser at a selected location in the region of interest;

receiving reflected light from the selected location in the region of interest at a receiver;

dispersing the received light by wavelength across a first axis at a dispersive element;

dispersing the received light by return angle across a second axis at a defocuser;

imaging the received light to provide an image; and measuring a metric representing a correlation between the wavelength and the return angle in the image to determine the presence of the object;

wherein measuring the metric representing a correlation between the wavelength and the return angle in the image to determine the presence of the object comprises determining a correlation length between the return angle and the wavelength in the image.

18. The method of claim 17, wherein measuring the metric representing a correlation between the wavelength and the return angle in the image to determine the presence of the object further comprises determining that the object is present if the correlation length exceeds a first threshold value and determining that the object is a man-made object if the correlation length exceeds a second threshold value.

19. The method of claim 17, wherein measuring the metric representing a correlation between the wavelength and the return angle in the image comprises determining one of the Moran I or Geary's C.

20. A method for determining the presence of an object within a region of interest, comprising:

projecting a broadband laser at a selected location in the region of interest;

receiving reflected light from the selected location in the region of interest at a receiver;

dispersing the received light by wavelength across a first axis at a dispersive element;

dispersing the received light by return angle across a second axis at a defocuser;

imaging the received light to provide a first image;

measuring a first metric representing a correlation between the wavelength and the return angle in the first image to determine the presence of the object;

selecting a new location in the region of interest;

projecting the broadband laser at the new location;

receiving reflected light from the new location in the region of interest at the receiver;

dispersing the received light from the new location by wavelength across the first axis at the dispersive element;

dispersing the received light from the new location by return angle across the second axis at the defocuser;

imaging the received light from the new location to provide a second image; and measuring a second metric representing a correlation between the wavelength and the return angle in the second image to determine the presence of the object.

* * * * *